(12) United States Patent
Lischinski et al.

(10) Patent No.: US 9,361,663 B2
(45) Date of Patent: Jun. 7, 2016

(54) APPLYING RAPID NUMERICAL APPROXIMATION OF CONVOLUTIONS WITH FILTERS FOR IMAGE PROCESSING PURPOSES

(75) Inventors: Daniel Lischinski, Jerusalem (IL); Raanan Fattal, Jerusalem (IL); Zeev Farbman, Jerusalem (IL)

(73) Assignee: Yissum Research Development Company of the Hebrew University of Jerusalem Ltd., Jerusalem (IL)

( * ) Notice: Subject to any disclaimer, the term of this patent is extended or adjusted under 35 U.S.C. 154(b) by 0 days.

(21) Appl. No.: 14/128,966

(22) PCT Filed: Jun. 27, 2012

(86) PCT No.: PCT/IB2012/053251
§ 371 (c)(1),
(2), (4) Date: Mar. 10, 2014

(87) PCT Pub. No.: WO2013/001467
PCT Pub. Date: Jan. 3, 2013

(65) Prior Publication Data
US 2014/0219579 A1 Aug. 7, 2014

Related U.S. Application Data

(60) Provisional application No. 61/501,392, filed on Jun. 27, 2011.

(51) Int. Cl.
*G06K 9/64* (2006.01)
*G06T 3/40* (2006.01)
(Continued)

(52) U.S. Cl.
CPC .............. *G06T 3/4084* (2013.01); *G06F 17/15* (2013.01); *G06T 5/20* (2013.01)

(58) Field of Classification Search
None
See application file for complete search history.

(56) References Cited

U.S. PATENT DOCUMENTS

| 5,881,181 A | 3/1999 | Ito |
| 6,757,645 B2 | 6/2004 | Chang et al. |

(Continued)

FOREIGN PATENT DOCUMENTS

| CN | 1696975 A | 11/2005 |
| CN | 1989525 A | 6/2007 |

OTHER PUBLICATIONS

LCIS: A Boundary Hierarchy for Detail-Preserving Contrast Reduction, Tumblin et al., Siggraph 99, pp. 83-90.
Farbman, Z. et al.: "Convolution Pyramids", ACM Transactions on Graphics, SIGGRAPH, Asia 2011, vol. 30, No. 6, Dec. 1, 2011.
Examination Report dated Apr. 7, 2015 for Canadian App. No. 2,839,098.
International Search Report dated Apr. 4, 2013 for PCT/IB2012/053251.

(Continued)

*Primary Examiner* — Phuoc Tran
(74) *Attorney, Agent, or Firm* — IP Spring (57) ABSTRACT

A computer implemented method for applying a numerical approximation of a convolution of image I as represented by hierarchical signals $a^l$ of level l with filter f, said method including the steps of: generating a forward transformation by applying a convolution between $a^l$ and kernel $h_1$ for each level of hierarchy l and by down-sampling the result of convolved $a^l$ and $h_1$; generating a backward transformation by applying, for each level of hierarchy l, a convolution between kernel $h_2$ and an up-sampled forward transformation and combining the result with a convolution of $a^l$ with kernel g; and combining the forward transformation with the backward transformation, to yield $â^0$ being an approximation of a convolution between a and f, wherein kernels $h_1$, $h_1$, and g are optimized kernels of filter f.

20 Claims, 6 Drawing Sheets

(51) Int. Cl.
G06F 17/15 (2006.01)
G06T 5/20 (2006.01)

(56) References Cited

U.S. PATENT DOCUMENTS

| | | |
|---|---|---|
| 6,973,218 B2 | 12/2005 | Alderson et al. |
| 6,985,615 B2 | 1/2006 | Shinbata |
| 6,993,200 B2 | 1/2006 | Tastl et al. |
| 7,675,524 B1 * | 3/2010 | Miller et al. ............... 345/586 |
| 8,401,265 B2 * | 3/2013 | Mathew et al. ............ 382/131 |
| 2008/0118173 A1 | 5/2008 | Maurer |
| 2008/0267494 A1 | 10/2008 | Cohen et al. |
| 2010/0124361 A1 * | 5/2010 | Gaddy ....................... 382/107 |

OTHER PUBLICATIONS

PCT International Preliminary Report on Patentability mailed in International Patent Application No. PCT/IB2012/053251, Jan. 7, 2014, 8 pages.

Cheng, Qiang, "An Image Watermarking Technique Using Pyramid Transform", Proceedings of the Ninth ACM International Conference on Multimedia; ACM, Sep. 30, 2001, pp. 319-328.

Han, Charles et al., "Optimizing Continuity in Multiscale Imagery", ACM Transactions on Graphics (TOG). vol. 29. No. 6. ACM, Dec. 31, 2010, 9 pages.

SIPO, First Office Action for Chinese Patent Application No. 201280031391.2, Dec. 10, 2015, 11 pages.

* cited by examiner

APPLYING RAPID NUMERICAL APPROXIMATION OF CONVOLUTIONS WITH FILTERS FOR IMAGE PROCESSING PURPOSES

BACKGROUND

1. Technical Field

The present invention relates to image processing and more particularly, to applying rapid numerical approximations of convolutions with filters in image processing.

2. Discussion of the Related Art

Figure 1:
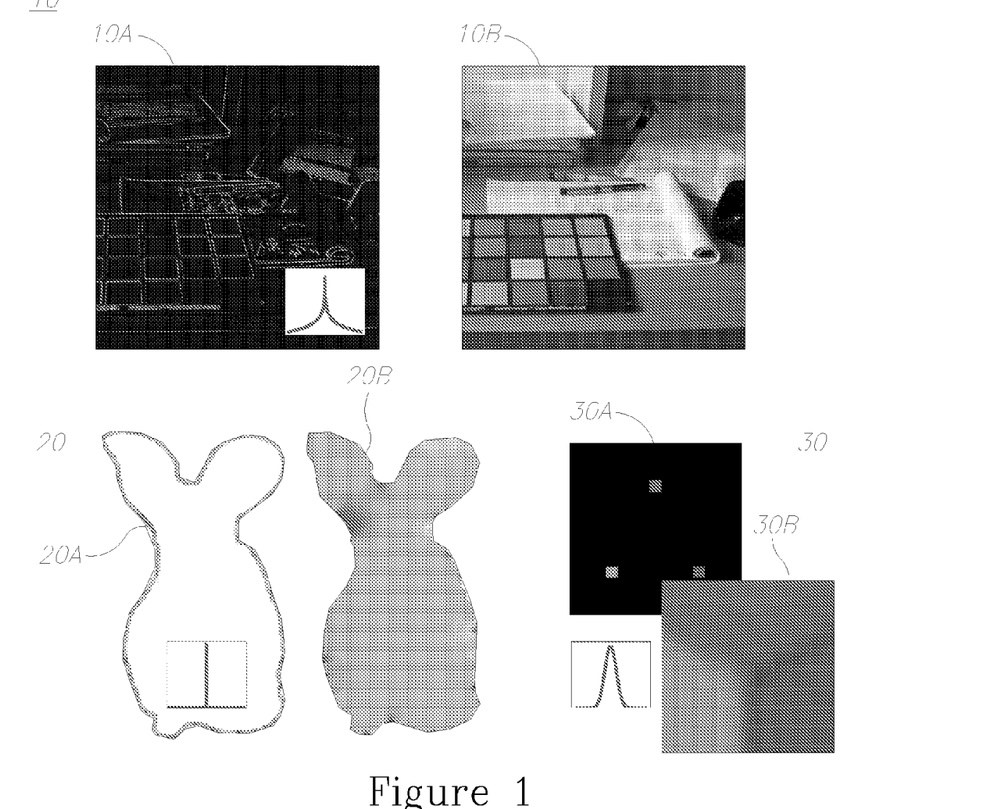
FIG. 1 shows several image processing applications illustrating several aspects of the present invention.

Many tasks in computer graphics and image processing involve applying large linear translation-invariant (LTI) filters to images. Common examples include low-pass and high-pass filtering of images, and measuring the image response to various filter banks. Some less obvious tasks that can also be accomplished using large LTI filters are demonstrated in FIG. 1: diagram 10 shows reconstructing images 10B by integrating their gradient field 10A; diagram 20 shows fitting a smooth membrane 20B to interpolate a set of boundary values 20A; and diagram 30 shows scattered data interpolation, with 30A as an input and 30B as an output.

While convolution is the most straightforward way of applying an LTI filter to an image, it comes with a high computational cost: O(n2) operations are required to convolve an n-pixel image with a kernel of comparable size. The Fast Fourier Transform (FFT) offers a more efficient, O(n log n) alternative for periodic domains. Other fast approaches have been proposed for certain special cases. For example, one such ad hoc algorithms describes a multiscale approach, which can approximate a convolution with a large Gaussian kernel in O(n) time at hierarchically subsampled locations.

Besides the straightforward O(n2) implementation of convolution, there are certain scenarios where it can be computed more efficiently. Over periodic domains, every convolution operator can be expressed as a circulant Topelitz matrix, which is diagonalized by the Fourier basis. Thus, convolutions with large kernels over periodic domains may be carried out in O(n log n) time using the Fast Fourier Transform.

Convolution with separable 2D kernels, which may be expressed as the outer product of two 1D kernels, can be sped up by first performing a 1D horizontal convolution, followed by one in the vertical direction (or vice versa). Thus, the cost is O(kn), where k is the length of the 1D kernels. Non-separable kernels may be approximated by separable ones using the SVD decomposition of the kernel B-spline filters of various orders and scales may be evaluated at constant time per pixel using repeated integration or generalized integral images.

Many methods have been developed specifically to approximate convolutions with Gaussian kernels, because of their important role. Of particular relevance to this work is the hierarchical discrete correlation scheme proposed. This multiscale scheme approximates a Gaussian pyramid in O(n) time. Since convolving with a Gaussian band limits the signal, interpolating the coarser levels back to the finer ones provides an approximation to a convolution with a large Gaussian kernel in O(n). However, this approximation is accurate only for Gaussians of certain widths.

The aforementioned ideas culminated in the Laplacian Pyramid, and were later connected with wavelets. More specifically, the Laplacian pyramid may be viewed as a high-density wavelet transform. These ideas are also echoed, where a multiscale bilateral filter pyramid is constructed in O(n log n) time. The Laplacian pyramid, as well as various other wavelet transforms decomposes a signal into its low and high frequencies, which was shown to be useful for a variety of analysis and synthesis tasks. In particular, it is possible to approximate the effect of convolutions with large kernels. However, even though these schemes rely on repeated convolution (typically with small kernels), they are not translation-invariant, i.e., if the input is translated, the resulting analysis and synthesis will not differ only by a translation. This is due to the subsampling operations these schemes use for achieving their fast O(n) performance.

One scenario, which gained considerable importance in the past decade, is the recovery of a signal from its convolved form, e.g., an image from its gradient field. This gives rise to a translation-invariant system of linear equations, such as the Poisson Equation. The corresponding matrices are, again, Topelitz matrices, which can be inverted in O(n log n) time, using FFT over periodic domains. However, there are even faster O(n) solvers for handling specific types of such equations over both periodic and non-periodic domains. The multigrid method and hierarchical basis preconditioning achieve linear performance by operating at multiple scales. A state-of-the-art multigrid solver for large gradient domain problems is described, and a GPU implementation for smaller problems is described. Since the matrices in these linear systems are circulant (or nearly circulant, depending on the domain), their inverse is also a circulant convolution matrix. Hence, in principle, the solution can be obtained (or approximated) by convolving the right-hand side with a kernel, e.g., the Green's function in cases of the infinite Poisson equation. Our approach enables accurately approximating the convolution with such kernels, and hence provides a more efficient, and easy to implement alternative for solving this type of equations.

Gradient domain techniques are also extensively used for seamless cloning and stitching, yielding a similar linear system, but with different (Dirichlet) boundary conditions, typically solved over irregularly shaped domains. In this scenario, the solution often boils down to computing a smooth membrane that interpolates a set of given boundary values describes a dedicated quad-tree based solver for such systems, while avoid solving a linear system altogether by using mean-value interpolation.

This approach can also be useful in more general scattered data interpolation scenarios, when there are many data points to be interpolated or when a dense evaluation of the interpolated function is needed. It would be advantageous therefore to provide an efficient approximation for scattered data interpolation where it is important to use large convolution filters that propagate the information to the entire domain.

BRIEF SUMMARY

The present invention, in embodiments thereof, provides a method for rapid numerical approximation of convolutions with filters of large support, for image processing purposes. The approach presented herein comprises a multi-scale scheme, fashioned after the wavelet transform, which computes the approximation in linear time. Given a specific large target filter to approximate, a numerical optimization is firstly used to design a set of small kernels, which are then used to perform the analysis and synthesis steps of the proposed multiscale transform. Once the optimization has been done, the resulting transform can be applied to any signal in linear time. It will be demonstrated herein that the proposed method is well suited for tasks such as gradient field integration, seamless image cloning, and scattered data interpolation, outperforming existing state-of-the-art methods.

Embodiments of the present invention aim at generalizing algorithms that approximate convolution with reduced complexity. A multiscale framework is proposed herein which is not limited to approximating a specific kernel, but can be tuned to reproduce the effect of a number of useful large LTI filters, while operating in O(n) time. Specifically, the applicability of the proposed framework shall be demonstrated below to convolutions with the Green's functions that span the solutions of the Poisson equation, inverse distance weighting kernels, as well as wide-support Gaussian kernels for scattered data interpolation.

The present invention, in embodiments thereof, provides a multiscale scheme, resembling the Laplacian Pyramid, as well as certain wavelet transforms. However, unlike these more general purpose transforms, the proposed approach is to custom-tailor the transform to directly approximate the effect of a given LTI operator. In other words, while state-of-the-art multiscale constructions are typically used to transform the problem into a space where it can be better solved, in the proposed approach the transform itself directly yields the desired solution.

For example, a non-limiting embodiment of the present invention repeatedly performs convolutions with three small, fixed-width kernels, while downsampling and upsampling the image, so as to operate on all of its scales. The weights of each of these kernels are numerically optimized such that the overall action of the transform best approximates a convolution operation with some target filter. The optimization only needs to be done once for each target filter, and then the resulting multiscale transform may be applied to any input signal in O(n) time. The motivation behind this design is to avoid dealing with the analytical challenges that arise from the non-idealness of small finite filters, on the one hand, while attempting to make the most out of the linear computational budget, on the other.

The ability of embodiments of the present invention to closely approximate convolutions with the free space Green's function is high enough to allow inverting a certain variant of the Poisson equation. It will be demonstrated herein that for this equation the suggested approach is faster than state-of-the-art solvers, such as those based on the multigrid method offering improved accuracy for a comparable number of operations, and a higher ease of implementation.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

The drawings together with the following detailed description make apparent to those skilled in the art how the invention may be embodied in practice.

DETAILED DESCRIPTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Following is a general description of the proposed framework in as well as the motivation for some of exemplary design decisions that were taken by the inventors. The adaptation of the framework to several important specific problems in computer graphics is discussed later on herein.

Linear translation-invariant filtering is used extensively in computer graphics and image processing for scale separation. Indeed, many image analysis and manipulation algorithms cannot succeed without suitably constructed multiscale (subband) decomposition. In most applications, the spectral accuracy needed when extracting a particular band is proportional to the band level: high-frequency components are typically extracted with small compact filters that achieve low localization in the frequency domain, while low frequencies are typically needed at a higher spectral accuracy and, hence, large low-pass filters are used.

Subband architectures such as wavelet transforms and Laplacian pyramids rely on a spectral "divide-and-conquer" strategy where, at every scale, the spectrum is partitioned via filtering and then the lower end of the spectrum, which may be subsampled without a major loss of data, is further split recursively. The subsampling step allows extracting progressively lower frequencies using filters of small fixed length, since the domain itself is shrinking and distant points become closer, due to the use of subsampling. This approach leads to highly efficient linear-time processing of signals and is capable of isolating low-frequency modes up to the largest spatial scale (the DC component of the image).

While it may not be a major obstacle for some applications, these decompositions suffer from two main shortcomings. First, the resulting transformed coordinates, and therefore the operations performed using these coordinates, are not invariant to translation.

Thus, unlike convolution, shifting the input image may change the outcome by more than just a spatial offset. Second, to achieve the O(n) running time, it is necessary to use finite impulse response filters. These filters can achieve some spatial and spectral localization but do not provide an ideal partitioning of the spectrum. As demonstrated herein, these properties are critical for some applications (such as solving the Poisson equation) and for the design of particularly shaped kernels. In fact, these two shortcomings dictate the design of the new scheme described below, whose aim is to achieve an optimal approximation of certain translation-invariant operators under the computational cost budget of $O(n)$.

Figure 2:
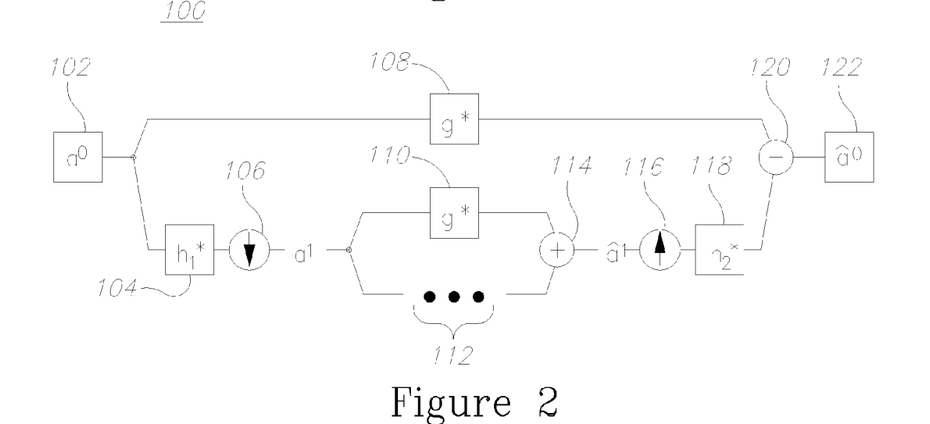
FIG. 2 is a high level block diagram illustrating an aspect according to some embodiments of the invention.

FIG. 2 illustrates a non-limiting exemplary system (100) that may implement the multiscale filtering scheme disclosed herein. It should be noted that system (100) may be implemented by using a software running on a digital signal processing (DSP) processor or a general purpose computer, or in an application specific integrated circuit (ASIC). In the proposed multiscale filtering scheme, the forward transform is carried out by convolving signal $a^0$(102) with an analysis filter $h_1$ (104), and subsampling the result by a factor of two using subsamplar (106). This process is then repeated on the subsampled data (112). Additionally, an unfiltered and unsampled copy of the signal is kept at each level. Formally, at each level of hierarchy, the following computation is carried out:

$$a^l_0 = a^l \quad (1)$$

$$a^{l+1} = \downarrow(h_1 * a^l) \quad (2)$$

wherein the superscript l denotes the level in the hierarchy and $a^l_0$ is the unfiltered data kept at each level, and $\downarrow$ denotes the subsampling operator. The transform is initiated by setting $a^0 = a$, where a is the input signal to be filtered.

The backward transformation (synthesis) comprises upsampling by inserting a zero between every two samples using an upsampler (116), followed by a convolution, with another filter, $h_2$ (118). The interpolated signal is combined by combiner (120) with the signal stored at that level after it is convolved with a third filter g (108), i.e., $$\hat{a}^l = h_2 * (\uparrow \hat{a}^{l+1}) + g * a^l_0 \quad (3)$$

wherein $\uparrow$ denotes the zero upsampling operator. It should be noted that unlike in most subband architectures, the proposed synthesis is not intended to invert the analysis and reproduce the input signal a, but rather the combined action of the forward and backward transforms $\hat{a}_0$ (122) is meant to approximate the result of some specific linear translation-invariant filtering operation applied to the input a (102).

This scheme resembles the discrete fast wavelet transform, up to the difference that, as in the Laplacian pyramid, the decomposed signal is not subsampled (the high-frequency band in these transformations and the all-band $a^l_0$ in the case presented herein). Similarly to the high density wavelet transformation, this choice is made in order to minimize the subsampling effect and to increase the translation invariance.

Assuming ideal filtering was computationally feasible, $h_1$ and $h_2$ could be chosen so as to perfectly isolate and reconstruct progressively lower frequency bands of the original data, in which case the role of g would be to approximate the desired filtering operation.

However, since it is desirable to keep the number of operations O(n), the filters $h_1$, $h_2$, and g must be finite and small. This means that the design of these filters must account for this lack of idealness and the resulting complex interplay between different frequency bands. Thus, rather than deriving the filters $h_1$, $h_2$, and g from explicit analytic filter design methodologies, these filters are numerically optimized such that their joint action will best achieve the desired filtering operation.

In summary, the approach presented herein includes identifying and allocating a certain amount of computations with reduced amount of subsampling, while remaining in the regime of O(n) computations and then optimizing this allocated computations to best approximate convolution with large filters.

Optimization

In order to approximate convolutions with a given target kernel f, we seek a set of kernels $F = \{h_1, h_2, g\}$ that minimizes the following functional $$\arg\min_F \|\hat{a}^0_F - f * a\|_2 \quad (4)$$

wherein â0F is the result of the proposed multiscale transform with the kernels F on some input a. In order to carry out this optimization it remains to determine the types of the kernels and the number of their unknown parameters. The choice of the training data a depends on the application, and will be discussed in the hereinafter. It is noted that once this optimization is complete and the optimal kernels are found, the scheme presented herein is ready to be used for approximating f*a on any given signal a. The optimal kernels used to produce our results are provided in the supplementary material, and hence no further optimization is required to use them in practice.

In order to minimize the number of total arithmetic operations, the kernels in F should be small and separable. The specific choices reported below correspond, in experiments carried out by the inventors, to a good trade-off between operation count and approximation accuracy. Using larger and/or non-separable filters increases the accuracy, and hence the specific choice depends on the application requirements. Remarkably, rather accurate results may be achieved using separable kernels in F, even for non-separable target filters f. This can be explained by the fact that the proposed transform sums the results of these kernels, and the sum of separable kernels is not necessarily separable itself.

Furthermore, the target filters f that were approximated have rotational and mirroring symmetries. Thus, asymmetry on our kernels is explicitly being enforced, which reduces the number of degrees of freedom and the number of local minima in the optimization. For example, a separable 3-by-3 kernel is defined by only two parameters ($[a, b, a] \cdot [a, b, a]^T$) and a separable 5-by-5 kernel by three parameters. As for non-separable kernels, a 5-by-5 kernel with these symmetries is defined by six parameters. Depending on the application, the nature of the target filter f and the desired approximation accuracy, different combinations of kernels in F are chosen.

In order to perform the optimization the BFGS quasi-Newton method is being used herein. In order to provide an initial guess the kernels are set to Gaussians. Each level is zero-padded by the size of the largest kernel in F at each level before filtering. Typically, the optimization process starts off on a low-resolution grid (32×32). This is fast, but the result may be influenced by the boundaries and the specific padding scheme used. Therefore, the result is then used as an initial guess for optimization over a high resolution grid, where the influence of the boundaries becomes negligible.

Applications and Results

In the following paragraphs, the method discussed above is being applied to special image processing tasks to approximate three different types of convolutions. The specific set of kernels F optimized for each of these applications may be determined using trial and error experimentations. The running times depend only on the size of these kernels. For illustrative purposes, some actually recorded running time performance is provided in Table 1 below:

TABLE 1

| Grid size (millions) | Time (sec., single core) |
|---|---|
| 0.26 | 0.00019 |
| 1.04 | 0.010 |
| 4.19 | 0.047 |
| 16.77 | 0.19 |
| 67.1 | 0.99 |

The actual running time results shown in Table 1 above were achieved for a convolutional pyramid with separable 5-by-5 kernels for $h_1$ and $h_2$ and a separable 3-by-3 kernel for g. Time recorded in table 1 exclude disk I/O and were measured on a 2.3 GHz Inter Core i7™ (2820qm) MacBook Pro™

Many computer graphics applications manipulate the gradient field of an image. These applications recover the image u that is closest in the L2 norm to the modified gradient field v by solving the Poisson equation:

$$\Delta u = \text{div } v \quad (5)$$

wherein $\Delta$ is a discrete Laplacian operator. Typically von Neumann boundary conditions, $\partial u/\partial n=0$ where n is the unit boundary normal vector, are enforced.

Green's functions G(x, x') define the fundamental solutions to the Poisson equation, and are defined by:

$$\Delta G(x,x') = \delta(x-x') \quad (6)$$

wherein $\delta$ is a discrete delta function. When (5) is defined over an infinite domain with no boundary conditions, the Laplacian operator becomes spatially-invariant, and so does its inverse. In this case, the Green's function becomes translation-invariant depending only on the (scalar) distance between x and x'. In two dimensions this free-space Green's function is given by:

$$G(x, x') = G(\|x - x'\|) = \frac{1}{2\pi} \log \frac{1}{\|x - x'\|} \quad (7)$$

Thus, for a compactly supported right-hand side, the solution of (5) is given by the convolution $$u = G * \text{div } v \quad (8)$$

This solution is also known as the Newtonian potential of divv. It can be approximated efficiently using our convolution pyramid, for example by zero-padding the right-hand side. The difference between this formulation and imposing von Neumann boundary conditions is that the latter enforces zero gradients on the boundary, while in the free-space formulation zero gradients on the boundary can be encoded in the right-hand side serving only as a soft constraint. Forcing the boundary gradients to zero is a somewhat arbitrary decision, and one might argue that it may be preferable to allow them to be determined by the function inside the domain.

To perform the optimization in (4) a natural grayscale image I has been chosen, and set the training signal a to the divergence of its gradient field: a=div $\nabla$I while f*a=I.

A natural image I has been chosen since the training data a should not be too localized in space (such as a delta function). The proposed scheme is not purely translation-invariant and a localized a might lead to an over-fitted optimum that would not perform as well in other regions where the training signal a is zero. Natural images are known to be stationary signals with no absolute spatial dependency and, moreover, this is the class of signals we would like to perform best on. Indeed, the resulting kernel sets and our scheme's performance did not show dependency on the particular image used.

Two kernel sets were computed, one geared towards higher accuracy, the other towards fastest computation. The first set $F_A$ consists of the same 7-by-7 separable kernel for $h_1$ and $h_2$ and another 7-by-7 separable kernel for g. The more compact set $F_B$ consists of a 5-by-5 separable kernel for $h_1$ and $h_2$ and a 3-by-3 separable kernel for g. The kernel sizes of $F_B$ correspond to the timings reported in Table 1 above.

Figure 3A:
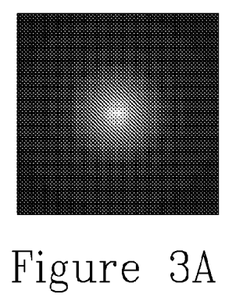
FIGS. 3A-3G show several images demonstrating an aspect of the present invention.

FIG. 3(a) shows a reconstruction of the free-space Green's function obtained by feeding our method a centered delta function as input. A comparison to the ground truth (the solution of (6)) reveals that the mean absolute error (MAE) is quite small even for the $F_B$ kernel set:

| grid size | $F_A$ MAE | $F_B$ MAE |
|---|---|---|
| 10242 | 0.0019 | 0.0031 |
| 20482 | 0.0015 | 0.0027 |

Figure 3B:
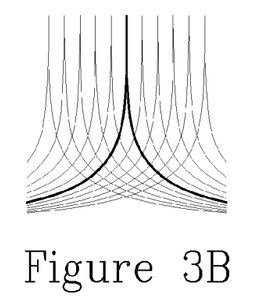

Changing the position of the delta function's spike along the x-axis and plotting a horizontal slice through the center of each resulting reconstruction (FIG. 3(b)), reveals that the proposed reconstructions exhibit very little spatial variance.

Figure 3C:
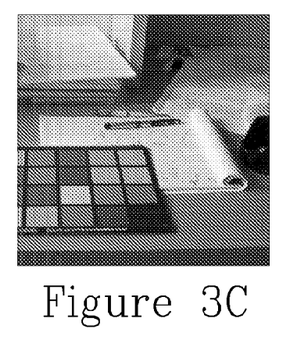
Figure 3D:
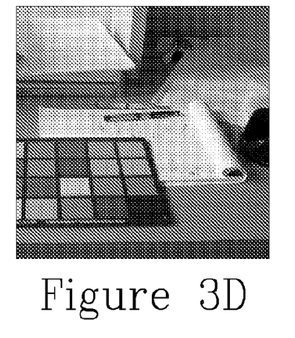
Figure 3E:
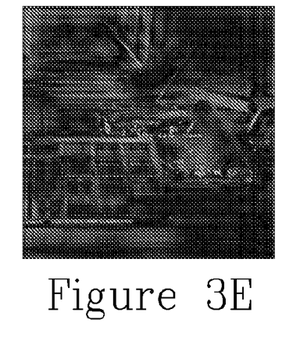
Figure 3F:
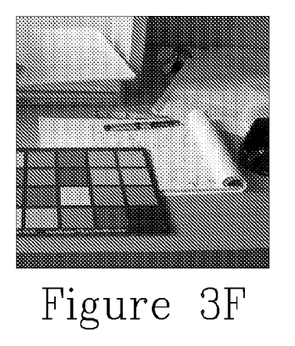
Figure 3G:
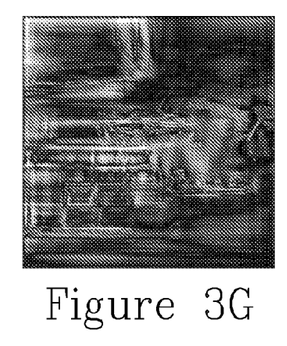
Figure 4A:
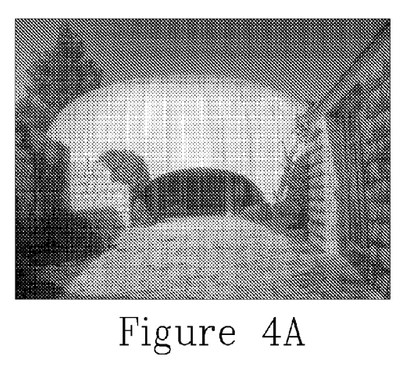
FIG. 4A-4F show several images demonstrating an aspect of the present invention.
Figure 4B:
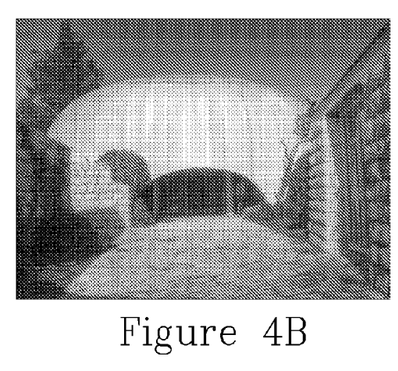
Figure 4C:
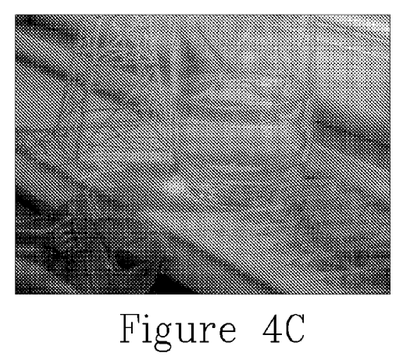
Figure 4D:
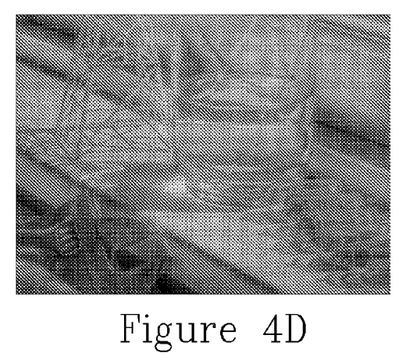
Figure 4E:
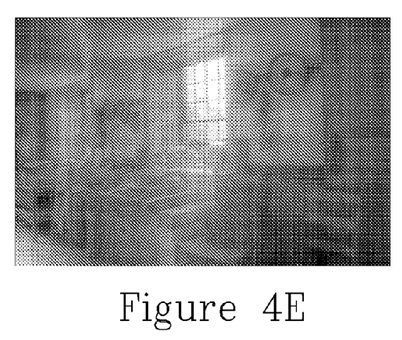
Figure 4F:
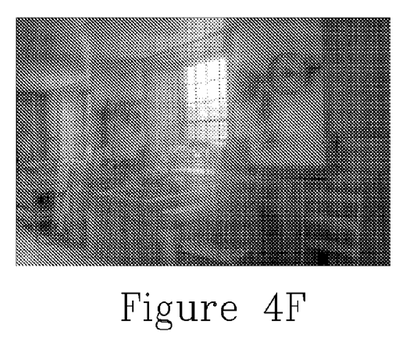
Figure 5A:
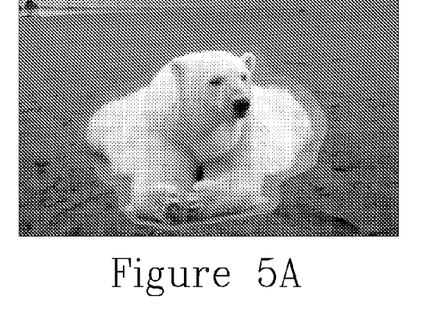
FIG. 5A-5E show several images demonstrating an aspect of the present invention.
Figure 5B:
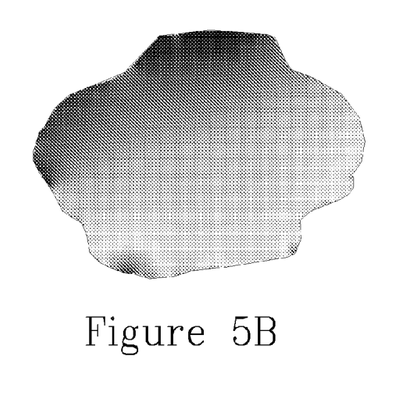
Figure 5C:
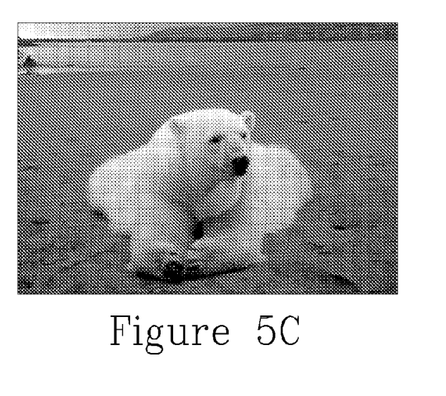
Figure 5D:
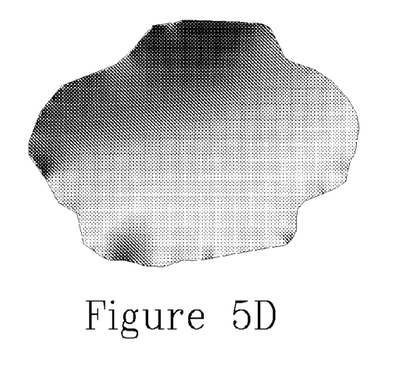
Figure 5E:
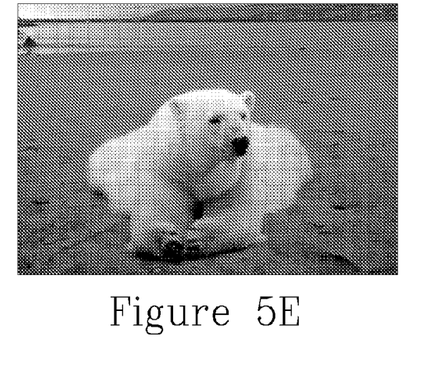
Figure 6A:
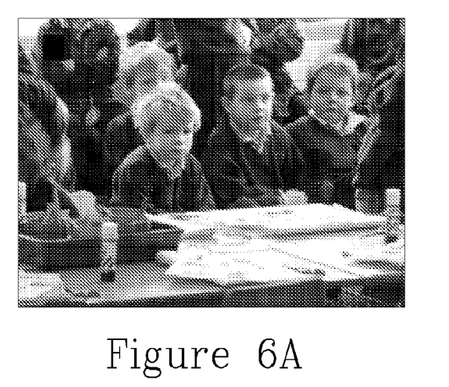
FIG. 6A-6F show several images and graphs demonstrating an aspect of the present invention.
Figure 6B:
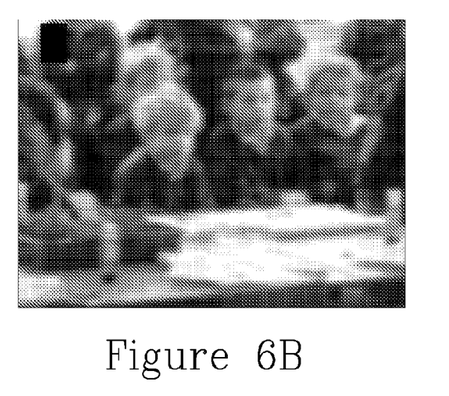
Figure 6C:
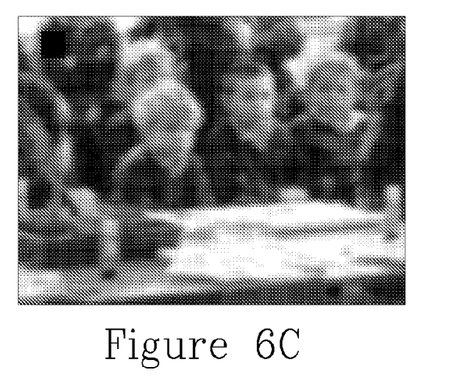
Figure 6D:
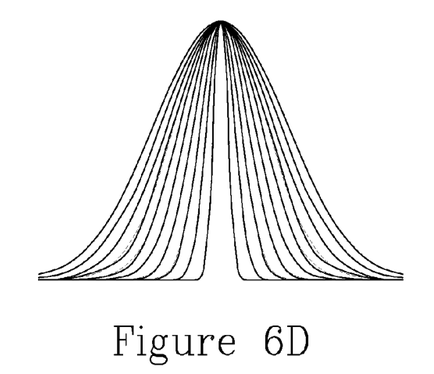
Figure 6E:
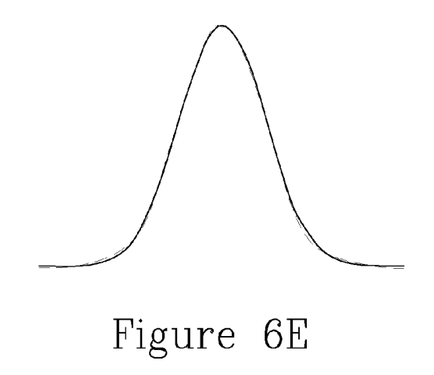
Figure 6F:
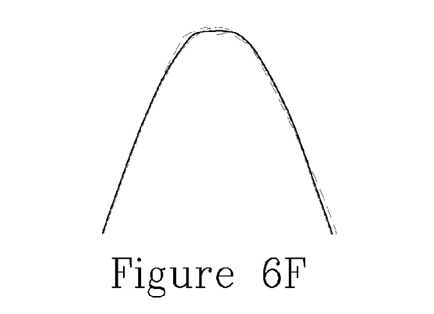
Figure 7A:
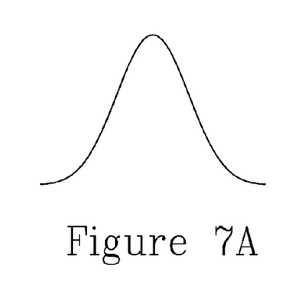
FIG. 7A-7I show several images and graphs demonstrating an aspect of the present invention.
Figure 7B:
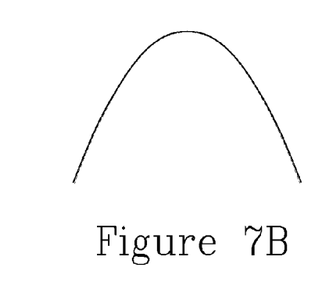
Figure 7C:
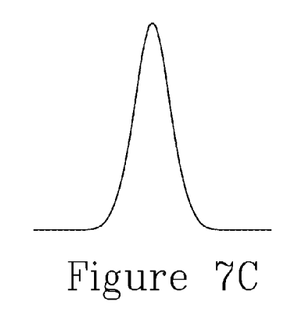
Figure 7D:
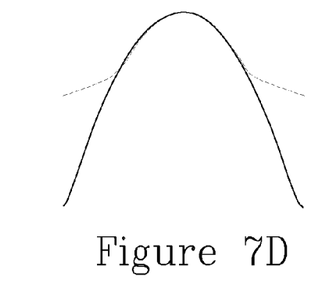
Figure 7E:
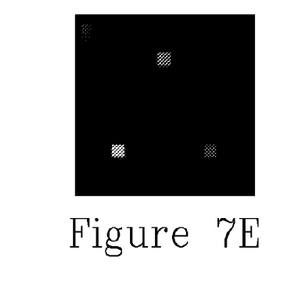
Figure 7F:
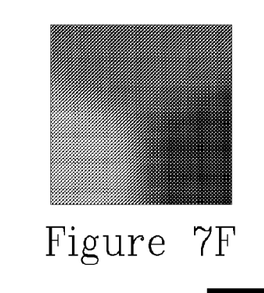
Figure 7G:
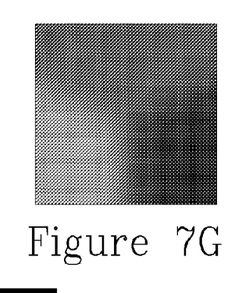
Figure 7H:
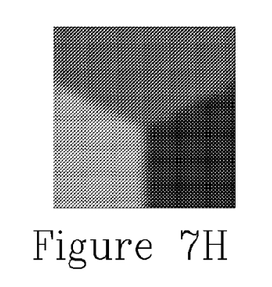
Figure 7I:
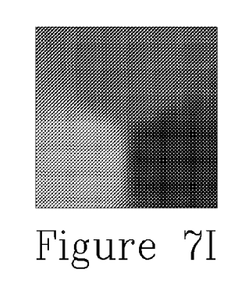

FIG. 3(c) shows a natural image (unrelated to the image that was chosen for the optimization process), whose gradient field divergence was given as input to the method provided herein.

Two reconstructions, with $F_A$ and $F_B$, and their corresponding errors are shown in images (d)-(g). The mean absolute error of our reconstruction is 0.0027 with $F_A$ and 0.0052 with $F_B$. Visually, it is difficult to tell the difference between either reconstruction and/or the original image.

In FIG. 4, HDR compression results are shown produced using gradient domain image compression. The results on the left were obtained using a Poisson solver with von Neumann boundary conditions, while those on the right use our approximation. In both cases, the same post-processing is been used, which consists of stretching the result so 0.5% of the pixels are dark-clipped.

While some differences between the results may be noticed, it is hard to prefer one over the other. Additional results are included in the supplementary material. In this context of image reconstruction, our method presents a faster alternative to linear solvers, while also being easier to implement.

The comparison of indicates that one of the fastest available CPU-based multigrid codes for this kind of reconstruction is the in-core version of solver. Thus, for a 4.2 megapixel image, the running time of this solver was 2.2 seconds, which is more than an order of magnitude slower than the 0.15 seconds required to run our method on the three channels of a color image of the same resolution (both times were measured on the same machine).

A GPU-based implementation of a multigrid solver is known in the art, which, at the time, enabled to integrate a one megapixel image about 20 times per second, supporting interactive gradient domain painting. In one implementation a single core CPU-based may be used to implement the aforementioned scheme. It has been shown that the suggested scheme already enables to integrate such an image 33 times per second. It is expected a GPU implementation to bring forth a significant additional speedup factor.

Since the exact running times depend on the desired accuracy and on the implementation specifics, it is important to gain a better understanding of the speedup in terms of operation counts. A multigrid solver performs restriction and prolongation operations to change grid resolutions, with a few relaxation iterations and one residual computation at each resolution. Although the restriction/prolongation kernels may vary between different schemes, their sizes (and hence costs) are typically comparable to those of our h1 and h2 kernels. The cost of a single Gauss-Seidel relaxation iteration is 6n. Together with the residual computation this yields 18n operations on the fine resolution grid, when a single V-cycle is performed with only one relaxation iteration before and after each restriction (known as the V (1, 1) scheme).

In comparison, applying the 3-by-3 g kernel in our method costs 12n operations (multiplications and additions) on the finest resolution grid.

Thus, the operation count of the proposed method is smaller than that of V (1, 1), while the accuracy achieve for it is better. In the multigrid implementation of the proposed method, V (1, 1) achieves a maximum absolute error of 0.05, which is almost an order of magnitude higher than the 0.005 error achieve using the proposed method with a 3-by-3 g kernel. In order to achieve higher accuracy, a multigrid solver might perform more V-cycles and use more relaxation iterations, with a corresponding increase in the number of operations. In the proposed approach, approximation accuracy may also be improved by using larger kernels, as demonstrated earlier.

Boundary Interpolation

Applications such as seamless image cloning and image stitching can be formulated as boundary value problems and effectively solved by constructing a smooth membrane that interpolates the differences along a seam between two images across some region of interest.

Such membranes have originally been built by solving the Laplace equation. However, it has been already shown that other smooth interpolation schemes, such as meanvalue interpolation may be used as well, offering computational advantages. It is therefore shown herein how to construct a suitable membrane even faster by approximating Shepard's scattered data interpolation method using a convolution pyramid.

Let $\Omega$ denote a region of interest (on a discrete regular grid), whose boundary values are given by b(x). The goal is to smoothly interpolate these values to all grid points inside $\Omega$. Shepard's method defines the interpolant r at x as a weighted average of known boundary values:

$$r(x) = \frac{\sum_k w_k(x) b(x_k)}{\sum_k w_k(x)} \tag{9}$$

wherein $x_k$ are the boundary points. In the experiments carried out by the inventors, they have found that a satisfactory membrane interpolant is obtained by using the following weight function:

$$w_k(x) = w(x_k, x) = 1/d(x_k, x)^3 \tag{10}$$

which has a strong spike at the boundary point $x_k$ and decays rapidly away from it.

Naive evaluation of (9) is expensive: assuming that the number of boundary values is K and the number of points in $\Omega$ is n, the computational cost is O(Kn). The proposed multiscale transform allows to approximate the computation in O(n) time. The first step is to re-write Shepard's method in terms of convolutions. $\hat{r}$ is defined as an extension of b to the entire domain:

$$\hat{r}(x_i) = \begin{cases} b(x_k), & \text{for } xi = x_k \text{ on the boundary} \\ 0 & \text{otherwise} \end{cases} \tag{11}$$

and rewrite (9) as a ratio of convolutions:

$$r(x_i) = \frac{\sum_{j=0}^{n} w(x_i, x_j) \hat{r}(x_j)}{\sum_{k=0}^{n} w(x_i, x_j) x_{\hat{r}}(x_j)} = \frac{w * \hat{r}}{w * X_{\hat{r}}} \tag{9}$$

$$\tag{12}$$

wherein $X_{\hat{r}}$ is the characteristic function corresponding to $\hat{r}(X_{\hat{r}}$ is 1 where $\hat{r}$ is non-zero, 0 otherwise). Intuitively, including the characteristic function X in the denominator ensures that the weights of the zeros in $\hat{r}$ are not accumulated.

Again, the optimization is used to find a set of kernels F, with which the proposed convolution pyramid can be applied to evaluate (12). To define the training data, b is set to be the boundary of a simple rectangular domain with random values assigned at the boundary grid points, and compute an exact membrane r(x) using (12). Our optimization then attempts to match r, which is a ratio of two convolutions, directly, rather than matching each convolution separately. This is important to ensure that the decay of the filter w is accurately reproduced by our transform over the entire domain.

As in the previous application, we were able to produce satisfactory interpolating membranes using a kernel set F consisting of 5-by-5 separable filters for h1, h2 and a single 3-by-3 separable filter for g, regardless of the size and the shape of the domain. These kernels are provided in the supplementary material.

In FIG. 5 we compare seamless image cloning using our method with that produced with a Laplacian membrane.

Note that despite the slight differences between the two membranes the final seamless compositing results of both methods are difficult to distinguish visually. The running time of this method amounts to two evaluation of approximate convolution, one with $\hat{R}$ and one with $X_{\hat{R}}$, where the times for a single convolution are reported in Table 1. It has already established in the previous section that the proposed approach outperforms state-of-the-art linear solvers. It remains, however, to compare the proposed method to the fast Mean Value Cloning (MVC) method which computes mean value coordinates at the vertices of an adaptive triangulation of the domain. In contrast to that method, the proposed approach does not require triangulating the domain and precomputing each pixel's barycentric coordinates to achieve interactive performance on the CPU. Furthermore, our method is completely independent of the size of the boundary, and avoids the somewhat sophisticated scheme that MVC employs for hierarchical sampling of the boundary. Experiments have shown that after 3.6 seconds of preprocessing time, it takes 0.37 seconds to seamlessly clone a 4.2 megapixel region (on a 2.5 MHz Athlon CPU). In comparison, the proposed method does not involve preprocessing, and clones the same number of pixels in 0.15 seconds.

Gaussian Kernels

In this section it is demonstrated how to use convolution pyramids to approximate convolutions with Gaussian kernels $e^{-\|x\|^2/2\sigma^2}$. It has been already shown how this can be done using an O(nlogn) multiscale scheme and described an O(n) variant that computes the result only on a coarse grid, whose spacing is inversely proportional to the Gaussian's width. While the resulting values can be interpolated to the original grid to yield an overall O(n) method, the effective kernels in both variants are truncated and their support depends on the scale Ω. Using the proposed scheme we can approximate the solution at the original fine grid in O(n) operations without truncating the filter support.

To carry out the optimization in (4) the training signal a was set to a sum of randomly translated and scaled delta functions, and f*a is obtained by a full convolution with the target Gaussian filter. This is intended to force the optimal kernels to achieve an adequate approximation across the entire domain, resulting in a transform that is effectively translation-invariant. The initial attempts to find a set F={h1, h2, g} that will provide a good approximation failed. The reason is that Gaussians are rather efficient low-pass filters and, depending on their scale σ, they should not contain high-frequency components coming from the finer levels of the pyramid. These components are introduced by the convolutions with the g kernel in (3), and we were able to obtain considerably better results by modulating the contribution of g at each level l by a scalar weight $w^l$.

These weights were added as additional degrees of freedom to optimize over, and indeed, the optimization resulted with significantly higher $w^l$ at the levels that are closest to the target Gaussian's scale.

It is noted that different sets of kernels F must be fit to obtain Gaussian filters of different scales.

FIG. 6 shows the impulse responses of ten convolution pyramids optimized to approximate Gaussians of ten different values of σ, superimposed with the exact impulse responses of the target Gaussians. In these pyramids we use 5-by-5 separable kernels for h1, h2, and g. Notice that the approximation is less accurate for certain values of σ. To improve the accuracy, we increase the allocated computational budget and use 7-by-7 separable kernels instead. FIG. 6(e-f) demonstrate the resulting improvement in accuracy.

The effective filters that integral images produce are truncated in space, i.e., they have a finite support that depends on the Gaussian scale σ. While this is not a major issue when the filtering is used for applications such as image blurring, this truncation has a significant effect when the filters are used for scattered data interpolation, such as Sheppard's method outlined in the previous section. In this application, we need the data to propagate, in a monotonically decreasing fashion, across the entire domain. A truncated kernel may lead to divisions by zero in (12) or to introduce abrupt transitions in the interpolated values.

FIG. 7 shows our approximation of two different Gaussian filters, differing in their width. These approximations were computed using the smaller 5-by-5 kernels. The approximation of the wider Gaussian in (a) provides a good fit across the entire domain. For the narrower Gaussian in (b), the approximation loses its relative accuracy as the Gaussian reaches very low values. This may be seen in the log plot in (d). It is noted however, that the approximation is still smooth and monotonically decaying. This slower decay lead to fuzzier transitions in the interpolated function compared to the exact scattered data interpolation, as shown in (h) and (i).

In summary, when using wide Gaussian weight functions or operating on a denser input dataset, our method provides an efficient and accurate approximation to scattered-data interpolation. Sparser datasets and narrower Gaussians reveal a limitation of our approximation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. A computer implemented method to generate a filtered image, the method comprising:
receiving image I as represented by input pixels $a^l$ where l denotes a level in a hieracarchy;
generating with a processor, a forward transformation by applying a convolution between the input pixels $a^l$ and kernel $h_1$ for each level of hierarchy l and by downsampling the result of convolved $a^l$ and $h_1$,
generating a backward transformation by applying, for each level of hierarchy l, a convolution between kernel $h_2$ and an up-sampled forward transformation and combining the result with a convolution of $a^l$ with kernel g;
generating the filtered image by combining the forward transformation with the backward transformation, to yield approximate convolution pixels $â^0$, wherein the approximate convolution pixels $â^0$ are an approximation of a convolution between $a^1$ and a filter f, wherein kernels $h_1$, $h_2$, and g are optimized kernels of the filter f, and wherein generating the filtered image has a lower computational cost compared to generating the filtered image using an unapproximated convolution; and
displaying the filtered image.

2. The method according to claim 1, further comprising performing image stitching of the filtered image with a second image based on the approximate convolution pixels $â^0$.

3. The method according to any of claims 1, wherein filter f is a linear translation invariant (LTI) filter.

4. The method according to claims 1, wherein combining the forward transformation with the backward transformation to yield the approximate convolution pixels $â^0$ further including achieving the optimized kernels by selecting a set of kernels F={$h_1$, $h_2$, g} that minimizes arg $\min_F \|â^0_F - f*a^1\|_2$, where $â^0_F$ is a result of a multiscale transform of the set of kernels F on the input $a^1$.

5. The method according to any of claims 1, wherein the downsampling is by a rate of 2.

6. The method according to claim 1, wherein generating the backward transformation includes upsampling by padding with zeros at a rate of 2.

7. The method according to claim 1, wherein the optimized kernels are be fit to obtain Gaussian filters of different scales.

8. The method according to claim 1, wherein the result of the convolution between the image I and the filter f results in a gradient field integration.

9. The method according to claim 1, wherein the result of the convolution between the image 1 and the filter f results in seamless image cloning.

10. The method according to claim 1, wherein the result of the convolution between the image 1 and the filter f results in scattered data interpolation.

11. A system to generate a filtered image, the system comprising:
one or more hardware processors configured to execute instructions stored in a memory, the instructions when executed by the one or more processors cause the one or more processors to:
receive image I as represented by input pixels $a^l$ where l denotes a level in a hierarchy;

generate a forward transformation by applying a convolution between the input pixels $a^l$ and kernel $h_1$ for each level of the hierarchy l and by down-sampling the result of convolved $a^l$ and $h_1$;

generate a backward transformation by applying, for each level of the hierarchy l, a convolution between kernel $h_2$ and an up-sampled forward transformation and combining the result with a convolution of $a^l$ with kernel g; and generate the filtered image by combining the forward transformation with the backward transformation to yield approximate convolution pixels $â^o$, wherein the approximate convolution pixels $â^o$ are an approximation of a convolution between $a^l$ and a filter f, wherein kernels $h_1$, $h_2$ and g are optimized kernels of the filter f, and wherein generating the filtered image has a lower computational cost compared to generating the filtered image using an unapproximated convolution; and a display device configured to display the filtered image.

12. The system of claim 11, wherein the instructions further cause the processor to determine the level of hierarchy l according to a specific image processing application requirement.

13. The system of claim 11, wherein the filter f is a linear translation invariant (LTI) filter.

14. The system according to claim 11, wherein combining the forward transformation with the backward transformation to yield the approximate convolution pixels $â^o$ further includes achieving the optimized kernels by selecting a set of kernels $F = \{h_1, h_2, g\}$ that minimizes arg $\min_F \|â^o{}_F - f*a^l\|_2$, where $â^o{}_F$ is a result of a multiscale transform of the set of kernels F on the input $a^l$.

15. The system according to claim 11, wherein the down-sampling is by a rate of 2.

16. The system according to claim 11, wherein the instructions to generate the backward transformation includes instructions to upsample by padding with zeros at a rate of 2.

17. The system according to claim 11, wherein the optimized kernels are fit to obtain Gaussian filters of different scales.

18. The system according to claim 11, wherein the result of the convolution between the image l and the filter f results in a gradient field integration.

19. The system according to claim 11, wherein the result of the convolution between the image l and the filter f results in seamless image cloning.

20. A non-transitory computer-readable storage medium encoded with computer-executable instructions to generate a filtered image that when executed by a computing device, cause the computing device to:

receive image l as represented by input pixels $a^l$ where l denotes a level in a hierarchy;

generate a forward transformation by applying a convolution between the input pixels $a^l$ and kernel $h_1$ for each level of the hierarchy l and by down-sampling the result of convolved $a^l$ and $h_1$;

generate a backward transformation by applying, for each level of the hierarchy l, a convolution between kernel $h_2$ and an up-sampled forward transformation and combining the result with a convolution of $a^l$ with kernel g;

generate the filtered image by combining the forward transformation with the backward transformation to yield approximate convolution pixels $â^o$, wherein the approximate convolution pixels $â^o$ are an approximation of a convolution between $a^l$ and a filter f, wherein kernels $h_1$, $h_2$ and g are optimized kernels of the filter f, and wherein generating the filtered image has a lower computational cost compared to generating the filtered image using an unapproximated convolution; and display the filtered image.

* * * * *